W. C. ELLIS.

Piano String and Bridge.

No. 9,237. Reissued June 8, 1880.

Witnesses:
E. P. Fairchild
H. G. Wadlin

Inventor:
W. C. Ellis
by Wright & Brown
Attys.

THE NORRIS PETERS CO., WASHINGTON, D. C.

UNITED STATES PATENT OFFICE.

WILLIAM C. ELLIS, OF WORCESTER, MASSACHUSETTS.

PIANO-STRING BRIDGE.

SPECIFICATION forming part of Reissued Letters Patent No. 9,237, dated June 8, 1880.

Original No. 144,849, dated November 25, 1873. Application for reissue filed April 1, 1880.

*To all whom it may concern:*

Be it known that I, WILLIAM C. ELLIS, of Worcester, in the county of Worcester and State of Massachusetts, have invented certain Improvements in Piano-Forte Bridges, of which the following is a specification.

Figure 1:
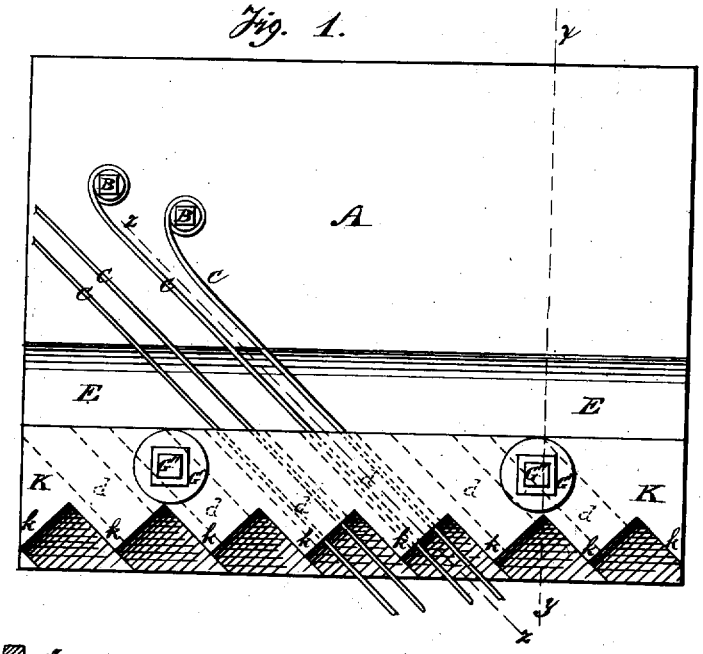
Figure 2:
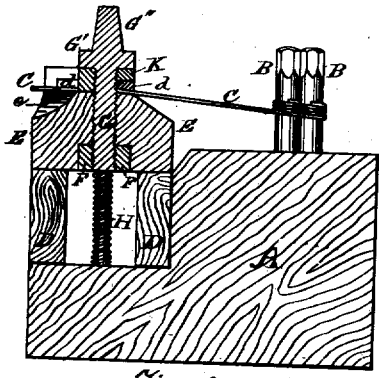
Figure 3:
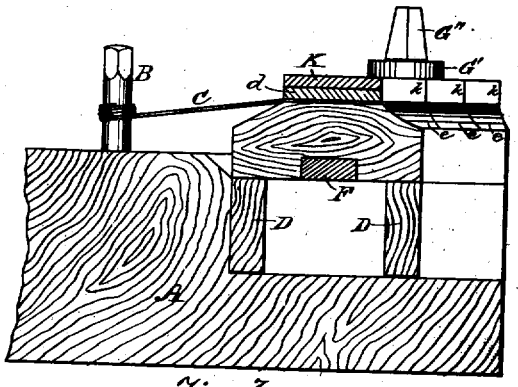

Figure 1 of the accompanying drawings is a top view, Fig. 2 a vertical transverse section on the line *z z*, and Fig. 3 a vertical transverse section on the line *x y*, of my improved piano-forte bridge.

My invention consists in the combination of a piano-string bridge having a non-metallic face, a superposed clamp having a non-metallic face, and piano-strings interposed between the two, the several parts being arranged so that the strings will be bound at opposite points between the lower surface of the clamp and the upper surface of the bridge, and contact of metal with the strings at the binding-points avoided.

My invention also consists in certain details of construction and combinations of parts, all of which I will now proceed to describe.

In the drawings, A represents the wrest-plank or pin-block of a piano-forte, provided with pins B, to which are attached strings C. The pin-block A may be cut away on the forward part, as shown, to receive glass or other resonant supports D to a wooden bridge, E, that extends throughout the scale, or the wooden bridge E may be placed directly on the pin-block, in which case the latter is not cut away on the front. The bridge E is recessed on the bottom to receive a nut or metallic plate, F, formed with screw-holes to receive screws G, that extend through the bridge.

K represents the clamp, which forms the chief portion of my invention. This clamp is a rigid bar of metal, adapted to bear upon the strings C and bind the latter tightly between its under surface and the upper surface of the bridge E. The clamp is provided with holes to receive the screws G, and each screw is provided with a head, G′, bearing upon the upper surface of the clamp, so that by turning the screws in one direction or the other the clamp will be forced down upon and caused to bind the strings tightly, or raised and caused to release the strings. Each screw is provided with a stem, G″, to receive a tuning-hammer or other suitable wrench, or screws may be adapted to be turned by any other means.

The bridge E is held to the block A or insulators D by screws H, or may be otherwise secured.

In the methods heretofore adopted of holding the strings by pins, two bearings, a side one and a downward one, are produced, thereby cramping the string at a certain point and causing an unequal tension between the tuning-pin and the sound-board bridge, besides, in tuning, the wear of the string against the bridge-pin renders it liable to break at this point. Moreover, the blow of the hammer from underneath forces the string from its bearing, thus throwing it out of tune. These objections are obviated by the employment of the clamp, which holds the strings in such manner that each string draws straight from the tuning-pin to the sound-board bridge, and the holding-pressure is on the top of the strings, holding them firmly in resistance to the upward blows of the hammer. The means provided for forcing down the clamp upon the strings enables the clamp to hold the strings with great firmness and prevent any possibility of their becoming loosened. The clamp, being also adapted to be raised, enables the strings to be released when the piano is being tuned, so that the strings can render easily on the bridge, which presents no point of wear.

By means of the clamp K and under plate, F, held by the screws G, a pressure is induced on the top and under side of the bridge, which gives solidity to it and prevents absorption of tone and lessens the liabilty of the strings getting out of tune.

The clamp also presents obvious points of advantage over the so-called "agraffe" method, in which an upward and downward bearing on the strings are produced, which brings a great strain on the string at the eye of the agraffe, thus rendering the string liable to break at this point. An unequal tension on the string is also produced in this case by the two bearings, and the string is apt to be thrown out of tune. In most cases the agraffe is only used through a portion of the scale, thus producing an uneven quality and quantity of tone in comparison to a bridge of one material.

In order to avoid the contact of metal with metallic strings, (which contact is objectionable, because it impairs the quality of tone,) I provide the clamp K with wood or other non-metallic material between the strings and the metallic portion of the clamp; and to attach the wood or other material to the clamp I prefer to provide recesses in the under surface of the latter, extending in the direction of the strings, and insert the wood or other non-metallic material into said recesses in the form of blocks or strips *d*. By this construction I obtain a clamp having the qualities of strength, stiffness, and rigidity of metal, without injuring the quality of the tone by direct contact of metal with the strings.

Having thus fully described my improvements, what I claim as my invention, and desire to have secured to me by Letters Patent, is—

1. The combination of a piano-string bridge having a non-metallic face, a superposed clamp having a non-metallic face, piano-strings interposed between the two, and means for binding the strings between them, the several parts being arranged as described, whereby the strings will be bound on one side by the clamp, and on the other side, under the clamp, by the bridge, and contact of metal with the strings at the binding-points avoided, substantially as set forth.

2. A piano-forte on which strings are held by non-metallic strips inserted in recesses formed in the bottom of a metallic clamp, adjusted to and bearing upon said bridge by screws engaging with a plate or nut located below the top of the bridge, substantially as specified.

3. In a piano-forte, a metallic clamp, K, formed with screw-holes, and on the bottom with recesses filled with wood or other non-metallic material, substantially as set forth.

4. In a piano-forte, a metallic clamp, K, having recesses in its under surface and wood or other non-metallic material fitted into said recesses, forming bearings for the strings, as set forth.

5. The combination of the clamp K, bridge E, metallic plate F, and screws G, as set forth.

6. The combination of a pin-block or wrest-plank, A, insulators D, bridge E, plate or nut F, clamp K, and strings C, as set forth.

WILLIAM C. ELLIS.

Witnesses:
SAMUEL MAC KINNY,
C. F. BROWN.